United States Patent [19]
Powell

[11] 4,033,118
[45] July 5, 1977

[54] MASS FLOW SOLAR ENERGY RECEIVER

[76] Inventor: William R. Powell, 10403 May Wind Court, Columbia, Md. 21044

[22] Filed: Aug. 19, 1974

[21] Appl. No.: 498,529

[52] U.S. Cl. .................. 60/641; 126/270; 126/271; 60/659
[51] Int. Cl.² .............. F03G 7/02; F24J 3/02
[58] Field of Search .............. 60/641; 126/270, 271

[56] References Cited
UNITED STATES PATENTS

| | | | |
|---|---|---|---|
| 294,117 | 2/1884 | Calver | 126/271 |
| 1,661,473 | 3/1928 | Goddard et al. | 126/271 |
| 1,951,403 | 3/1934 | Goddard | 126/271 |
| 1,969,839 | 8/1934 | Goddard | 126/271 |
| 2,933,885 | 4/1960 | Benedek et al. | 60/659 |
| 3,869,199 | 3/1975 | Cummings | 126/270 X |

*Primary Examiner*—Allen M. Ostrager
*Attorney, Agent, or Firm*—Kenneth E. Darnell

[57] ABSTRACT

A receiver for collecting solar energy at high temperatures with low reradiation losses, the invention comprises in a preferred embodiment an insulated cavity absorber wherein a temperature gradient exists from the receiving end of the absorber toward the closed end thereof. The closed end exists at a higher temperature than the receiving end due to the cooling effect of a flow of fluid directed into contact with the walls of the absorber from the receiving end toward the closed end, the fluid being additionally utilized to extract heat from the absorber for utilization thereof.

18 Claims, 6 Drawing Figures

EXTERNAL FLUID FLOW

MASS FLOW SOLAR ENERGY RECEIVER

BACKGROUND OF THE INVENTION

A. Field of the Invention

The invention relates to energy receiving apparatus, particularly of the collecting type whereby radiation is absorbed by or emitted from the collecting apparatus. The invention is particularly useful for efficiently collecting solar energy at temperatures sufficiently high to permit effective conversion of the collected solar energy to other useful forms of energy.

B. Description of the Prior Art

Solar receivers and collectors of the absorbing type are generally limited in their performance at high temperatures by reradiation losses which are directly proportional to the fourth power of the temperature of the apparatus. Prior art solar energy collecting apparatus have included "cavity absorbers", such as are disclosed in U.S. Pat. Nos. 3,208,447; 2,793,018; and 2,760,920; which absorbers are comprised of "silvered" tubular units having an "entrance" end located at the focus of an optical system for concentrating the sun's light into an absorbing "black body" cavity internal of the tubular unit. However, reradiation loss from a cavity absorber of this type at temperatures sufficiently high to be useful in Carnot engines, turbines, or the like is comparable to the energy entering the absorber due to the $T^4$ effect mentioned above. Thus, cavity absorbers have proven to be particularly inefficient at the relatively high temperatures required for efficient Carnot cycle operation. U.S. Pat. Nos. 3,217,702 and 2,872,915 provide means for reducing reradiation loss by reflecting at least a portion of this loss back into the cavity. However, the efficiency of cavity absorbers has not been appreciably increased until the conception of the present invention wherein reradiation from a cavity absorber is substantially prevented rather than merely recovered in part. In effect, the present invention provides inexpensive apparatus useful with economical solar concentrating apparatus for efficiently converting incident solar energy to heat energy at a temperature sufficiently high to perform useful work.

SUMMARY OF THE INVENTION

In a simplified form of the invention a cavity absorber is cooled at its entrance end by a mass fluid flow through the entrance end, the fluid extracting heat from the absorbing walls of the cavity absorber during passing of the fluid through the cavity. The heated fluid is removed from the absorber at a closed end opposite said entrance end, the energy in the heated fluid then being either stored or directly utilized for power generation or to perform work. The fluid flowing through the absorber is in thermal contact with the interior walls of the absorber and creates a temperature gradient in the cavity thereof, the temperatures being relatively higher at the closed end of the absorber than at the entrance end. Thus, the entrance end of the absorber can be held at a relatively low temperature which significantly reduces reradiation losses from the absorber. While temperatures at and near the entrance end of the absorber can be held relatively low, temperatures at the closed end of the absorber can be held relatively high, thereby permitting heating of the mass of fluid flowing through the cavity to a usefully high level while limiting reradiation loss from the cavity.

The present energy receiving apparatus preferably takes the form of either a solar energy absorber or energy emitter. The apparatus comprises a hollow member having an open entrance end and a closed, essentially black body end, the entrance end being located at the focus of any suitable energy concentrating apparatus, such as a paraboloid mirror. The central longitudinal axis of the member is generally disposed coaxially along the concentrating axis of the mirror or other concentrating apparatus. Light energy entering the absorber, such as from the sun, is absorbed by the interior walls of the absorber, often after multiple internal reflections. The interior walls of the absorber being comprised of glass, quartz, glass graded into quartz, or any other absorptive material having the desired absorptive characteristics. The exterior walls of the absorber are silvered in a known fashion to promote internal specular reflections of the non-thermal energy within the cavity of the absorber. The absorber is insulated along its length exteriorly by insulative materials such as metal foils or combinations of metal foils and oxide layers or layers of insulating spheres in a vacuum. A mass flow of a suitably chosen fluid is directed either externally around the absorbing member or through the cavity itself to extract heat from the walls of the member, the flow of fluid acting to induce a thermal gradient within the member, the entrance end thereof being at a low temperature relative to the closed end of the member. Thus, the portions of the absorbing member which are most capable of radiating long-wavelength radiation, i.e., those portions at or near the entrance end, are kept relatively "cool" by transfer of absorbed heat to the fluid, the fluid being further heated during its flow along the member until the fluid is removed from contact with the absorbing member at the closed end thereof.

Accordingly, it is a primary obect of the invention to cool the entrance end of a high temperature cavity absorbing apparatus by the flow of fluid along the length of the cavity to extract absorbed radiation in the form of heat from the walls thereof, the fluid flow creating a significant temperature gradient along the absorbing apparatus, the entrance end thereof being cool relative to the opposite, closed end thereof.

It is another object of the invention to provide insulative means for a cavity absorbing apparatus.

It is a further object of the invention to provide a solar energy utilization system wherein solar energy collected and concentrated by optical elements is directed into a cavity absorbing member for absorption by the interior walls of the member, the energy thus absorbed being extracted as heat by a fluid flow along the walls and in thermal contact therewith, the fluid flow acting to cool the entrance end of the absorbing member to prevent reradiation loss therefrom and to remove the energy from the member for storage in a thermal or chemical storage unit or for direct use in a thermal engine or the like.

Further objects and advantages of the invention will become more readily apparent in light of the following detailed description of the invention.

DESCRIPTION OF THE PREFERRED EMBODIMENTS

The present invention provides in the several embodiments thereof apparatus of the energy absorbing (or emitting) type used as part of an indirect energy converter, the thermal output of the apparatus being converted into power in a thermal engine or the like. In order for absorbing apparatus to be efficient, black body characteristics have been thought necessary. However, elevated temperatures necessary for high Carnot efficiency cause loss of absorbed energy by reradiation from the absorbing portion of the apparatus. While selectively absorbing surfaces having high absorptivity to emissivity ratios, i.e., a/e, have been fabricated and exhibit values on the order of 10 for temperatures below 500° C, the present apparatus exhibits at its entrance hole (or virtual surface) an effective a/e >500 while producing exhaust temperatures in excess of 1000° C. In principle, those portions of the present absorber which would radiate relatively long-wavelength radiation are kept cool by transfer of absorbed heat to a mass flow moving through the absorber from the entrance end thereof toward the opposite end of the absorber. The opposite end of the absorber is closed and exhibits essentially black body characteristics, the mass flow reaching its highest temperature at this closed end prior to removal from thermal contact with the absorber.

Figure 1:
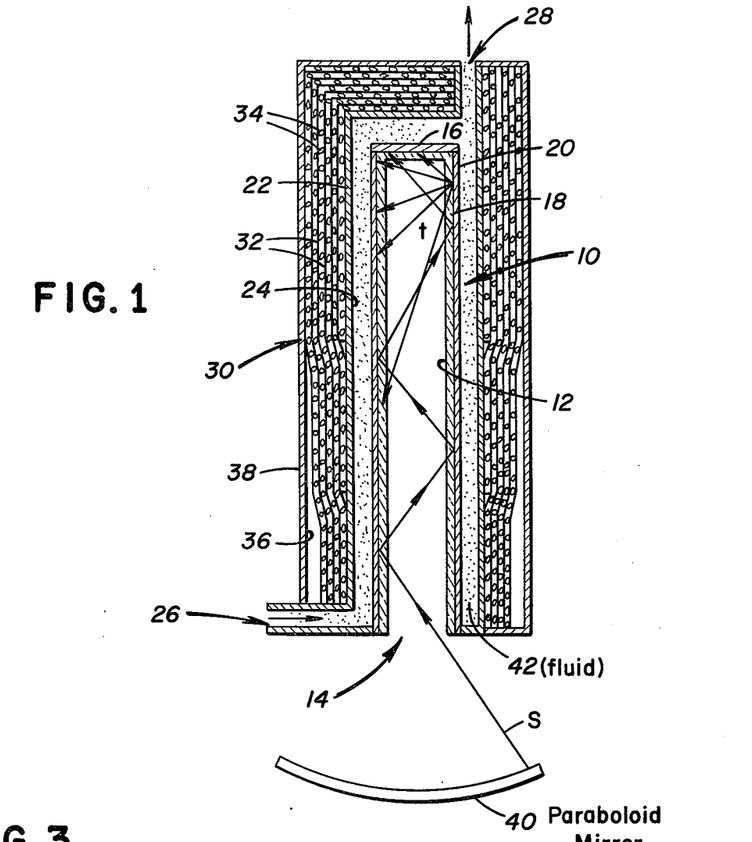
FIG. 1 is an elevational view in section of a cavity absorber according to the invention wherein mass fluid flow is channeled along the exterior walls of the absorber.

A first embodiment of the invention is shown in FIG. 1 to comprise a long, thin-walled absorber 10 defining a central cavity 12, the material comprising the absorber 10 being in the simplest form glass, quartz, or a combination of the two substances such as will be described in detail hereinafter. The absorber 10 could be bored from diamond, sapphire, or quartz as long as transparency is maintained. The absorber 10 could also conveniently be formed of a "hollow" rectangular solid such as would be formed by two rectangular spaced plates enclosed about the perimeters thereof. Practically speaking, a glass tube is useful also. Quartz doped to yield glass-like properties at the open end portion of the absorber and "grading" into a pure quartz at the hot portion thereof as will be described is of utility. The thickness of the walls of the absorber can be as thin as is practically possible as long as infrared radiation can be absorbed thereby. Embodiments of the invention using external flow of a cooling mass are to be made thinner as a practical matter than those embodiments wherein the cooling mass is flowed internally of the absorber. A thickness of approximately 1.0 mm in either case is generally acceptable from an absorptive standpoint although the wall thickness would normally be increased to lend structural integrity. The absorber 10 is open at its entrance end 14 and sealed with a "black" cap 16 at its opposite end. The outer surface 18 of the absorber 10 is coated with a highly reflecting film 20 such as a silver film or a film of other highly reflective material such as mercury, nickel, or chromium. A second member 22 of slightly greater interior dimensions than the external dimensions of the absorber 10 surrounds the absorber 10 and is spaced a finite distance therefrom to define an essentially annular circulation chamber 24 between the absorber 10 and the member 22. The absorber 10 and member 22 may each be of a cylindrical, rectangular, or other conformation including various cross-sectional geometries of a tubular conformation as long as the radial dimension is smaller than the longitudinal dimension. In practice, the longitudinal dimension is at least ten to fifteen times greater than the radial dimension. The circulation chamber 24 is sealed except for an inlet 26 near the entrance end 14 of the absorber 10 and an outlet 28 near the cap 16 of said absorber. The assembly thus described is insulated by high temperature insulation shown generally at 30, which insulation 30 may comprise suitable well-known insulatory materials or which may comprise layers 32 of metal foil separated by thin layers 34 of oxide dust, or insulating spheres made of hollow glass beads. The layers 32 and 34 are shown enlarged relative to the remaining structure for clarification of the structure thereof. The insulation 30 is held against the exterior walls of the member 22 and within an evacuated chamber 36 defined by vacuum wall 38. The layers 32 of foil may preferably be greater in number at the end of the member 22 opposite the entrance end 14 of the absorber 10, the outermost layer of foil extending the full length of the member 22 and the innermost layers of foil covering only reduced portions of the member 22 near the cap 16 of the absorber 10. This insulative design may be utilized to maximize the favorable effect of not only the radial temperature gradient which exists inside the absorber 10, but also of the axial temperature gradient within said absorber. The shorter foil layers at the "hot" end of the member 22 prevent conduction of heat along their lengths back toward the "cold" end of the member 22.

Further discussion of the nature of the member 22 is believed to be helpful at this point to insure optimum operation of the absorber 10. The member 22 may be comprised of quartz or fused silica having a continuous increase of doping-type substances such as $Na_2O$ (to about 15%) and $CaO$ (to about 10%) from the closed end thereof toward the entrance end 14, thus forming a typical soda-lime-silica glass which would absorb infrared radiation particularly well at the entrance end 14, the member being essentially pure quartz at its hot portion, i.e., the "closed" end. It is to be understood that materials other than as specifically described but which exhibit the properties and capabilities described herein fall within the scope of the invention due to the teachings herein.

The entrance end 14 of the absorber 10 is disposed at the focus of suitable energy collecting and concentrating optics, such as a paraboloid mirror 40. When solar energy is to be collected and utilized with the mirror 40, the closed end of the absorber 10, i.e., that end enclosed by the cap 16, is pointed at the sun while the entrance end 14 of the absorber 10 substantially encompasses the image of the sun which is formed by the mirror 40.

Figure 2:
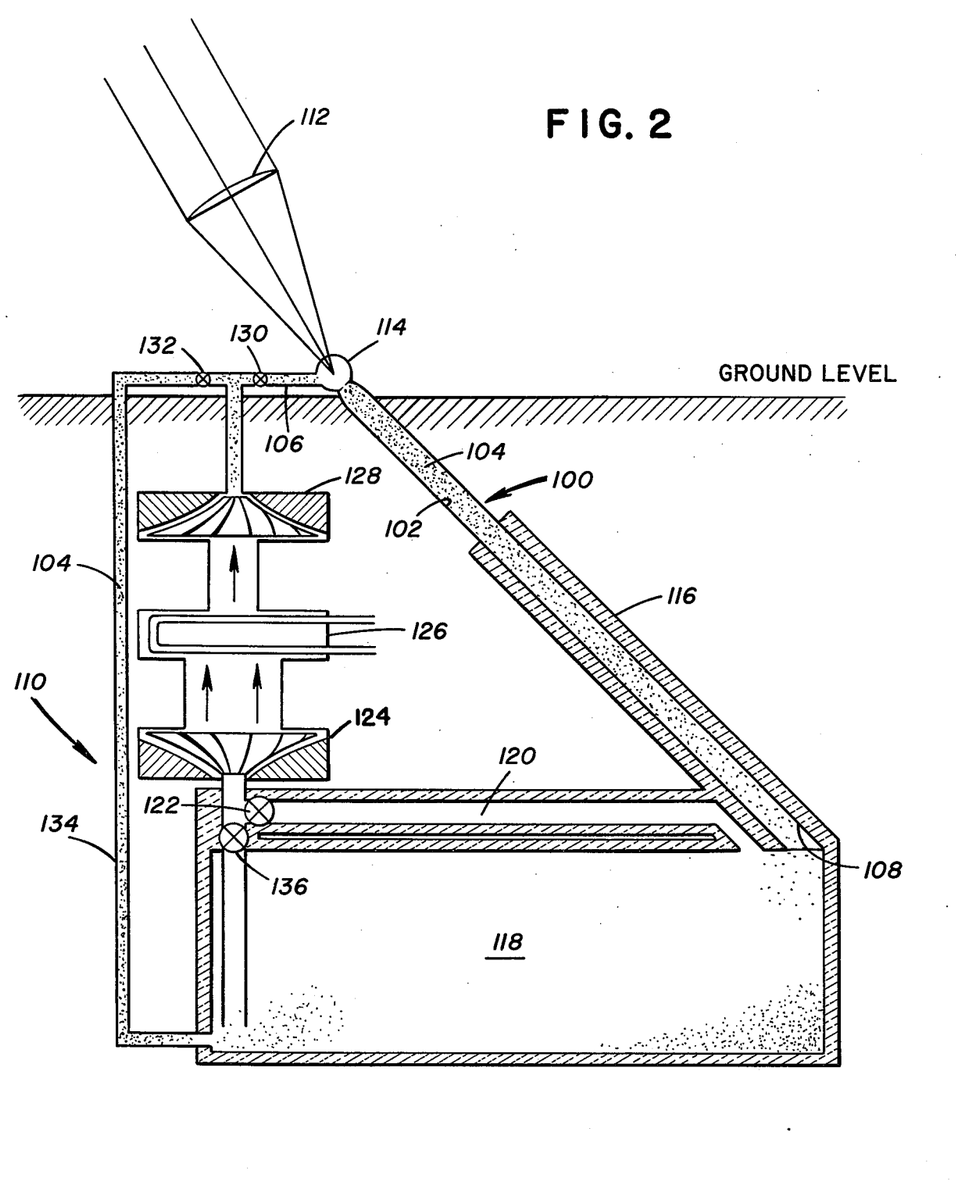
FIG. 2 is an idealized view in partial section of a thermal energy storage system utilizing a tubular cavity absorber according to the invention wherein mass fluid flow is channeled along the internal walls of the tubular absorber.

In the embodiment of FIG. 1, the closed end of the absorber 10 is pointed at the sun due to the fact that the solar image entering the open end of the absorber is formed by the single concentrating mirror 40. If a lens is directly used, for example, then the closed end of the absorber 10 would be pointed away from the sun as is shown in FIG. 2. The absorber 10 may be made stationary for reasons of economy or may be made to "follow" the sun in a known fashion. In the situation where the absorber 10 is rectangular in conformation, the entrance end 14 takes the form of a slit or slot and has certain inherent "sun-following" characteristics. In order to maximize overall efficiency, the open end of the absorber 10 must encompass most of the sun's image. A cooling fluid 42 is directed through the inlet 26, filling the circulation chamber 24, and coming into thermal contact with the outer surface 18 of the absorber 10. The fluid 42 may be gaseous, such as air, $H_2S$, the noble gases, or any heat absorbing gas, or a liquid, such as water, eutectic sodium and potassium, or mercury (in which case the mercury could form the reflecting film 20 as well as the cooling fluid 42. If, as in certain embodiments of the invention, the fluid 42 is flowed internally of the absorber 10, the fluid must be transparent to light. Otherwise, the fluid 42 may be chosen as desired for properties other than heat absorptive capacity, such as for the ability to chemically react on exposure to the heat generated at the hot end of the absorber 10 or for heavy atomic mass for driving a turbine, etc. While light flux enters the entrance end 14 of the absorber at a multiplicity of incidence angles, an "average" photon is represented by S in FIG. 1 as entering the entrance end 14 and being multiply reflected from the silvered film 20 before being absorbed by the walls of the absorber 10 as heat. The thermal flux incident on the walls of the absorber 10 is much less intense than the flux across the mouth of the entrance end 14. If the absorber 10 be made sufficiently long such that most of the energy entering the end 14 is absorbed prior to reaching the end cap 16, then virtually all of the energy is absorbed, i.e., $a \approx 1$. The fluid 42 is contact with the outer surface 18 of the absorber 10 absorbs this heat energy from the walls of the absorber 10 and, since the fluid 42 is made to flow from the vicinity of the entrance end 14 to the outlet 28 at approximately the same temperature as the closed end of the absorber 10, the closed end of said absorber being filled with essentially black body radiation characteristic of this temperature which will be referred to hereinafter as $T_L$. In practical use, a length to diameter ratio of approximately 15 is adequate for the absorber 10, although it is to be understood that such a ratio is not limiting.

The flow of the fluid 42 along the walls of the absorber 10 removes heat therefrom at a usefully high temperature, the heat energy in the fluid 42 being thereby utilized in a variety of ways. However, this cooling flow of fluid also serves to prevent reradiation loss from the absorber 10 by "cooling" the entrance end 14 of the absorber to reduce the reradiation loss which is proportional to the fourth power of the temperature. A temperature gradient extending axially along the absorber 10 thus exists as well as the expected radial thermal gradient. Even with the advantages brough about by this mass flow in contact with the walls of the absorber 10, much of the radiation energy entering the absorber 10 will escape as thermal radiation if the wavelength selective properties of the walls of the absorber 10 are not properly considered. Only a small fraction of the intense black body radiation filling the closed end of the absorber 10 can escape directly, i.e., in a direction axially of the absorber. Even so, much of this directly escaping radiation is reflected back into the absorber by the "shadowed" or central section of the mirror 40. It is therefore to be understood that, for most of the radiation generated by the walls of the absorber 10 at temperature $T_L$ or less, the walls are to be opaque. Consequently, the intense wall radiation at the closed end of the absorber 10 cannot "see" the film 20 and "mirror" its way out in a reflecting path as did the solar radiation coming into the absorber. In a known fashion, glass is a convenient material for the walls of the absorber 10 due to its opacity to infrared radiation, this opacity being due to absorption of infrared radiation rather than reflection thereof. In the interest of increased Carnot efficiency, i.e., higher $T_L$, quartz can be used to replace glass at the closed or hot end of the absorber 10, the device being more efficient if the glass "grades" into quartz rather than having distinct glass/quartz regions in the absorber 10. If quartz is used as the material composing the walls of the absorber 10, it could be doped with a well-known infrared absorber near the entrance end 14 in order to preserve the selective mirroring action of glass. The walls of the absorber 10 are preferably thin, especially where heat is to be transferred through the walls, but the walls must be thick enough to be opaque to the wall radiation. Either quartz or glass is capable of absorbing most of the heat radiation in the absorber 10, quartz being particularly more suitable at higher temperatures. However, a grading of these two materials, i.e., glass near the entrance end 14 and quartz near the closed end of the absorber 10 with a blend or grading of the two materials or with substances approximating the characteristics of the two materials is desirable. For wavelenghts less than approximately $4\mu$, the infrared transmission "cutoff" for quartz (wavelenghts transparent to quartz), quartz does not radiate well. Thus, even though some black body radiation may be of sufficiently short wavelength to be in the glass transmission "window", i.e., $\leq 2\mu$, there is virtually no quartz body radiation in this region. Thus, the wall material at the closed or hot end of the absorber 10 is preferably formed of a material like quartz having a higher transparent-opaque transition wave length (e.g., $4\mu$ than the wall material at the entrance end 14, such as glass at $2\mu$. Further, the two materials can preferably grade into each other so that for incremental sections of the absorber 10, a section nearer the entrance end 14, for example, will still be a good absorber for the wavelength that the next section toward the closed end is "becoming" a "bad" emitter of. Stated differently, as the transparent-opaque transition wavelength increases with distance from the entrance end 14, any wavelength radiated well by the relatively hot wall material further from the entrance end, and said radiation being directed toward the entrance end, will be absorbed well by the wall material on which said wavelength is incident. Even certain wavelengths not radiated well by the more remote hot wall material at the closed hot end of the absorber 10 are still absorbed well by the wall material closer to the entrance end 14. Thus, for example, the fact that glass is opaque at $3\mu$ while quartz is transparent at that wavelength reduces loss of radiation at that wavelength when the absorber 10 is structured according to the above description.

The following analysis of absorber performance is presented to show the improvement over the prior art of even the most simple, less efficient embodiment of the invention. While environmental radiation entering along with the focused sunlight is neglected in this analysis, such radiation increases the useful output of the absorber.

The abosrber 10 is assumed to be tubular and to be perfectly insulated so that the total energy transport rate across each cross-section thereof can be taken as constant. The net power absorber is then seen to be:

$$P_n = C(x) - K(x) - f_n(x) + F_s(x) + f_r(x) \tag{1}$$

where:
$x$ = distance from the entrance end 14 of the absorber 10;
$C(x)$ = the convective energy rate;
$K(x)$ = the power transported back toward the entrance end 14 by thermal conduction;
$f_n(x)$ = the net wall radiation traveling back toward the entrance end 14;
$F_s(x)$ = the short wavelength radiation from the sun which reaches $x$ without prior adsorption; and,
$f_r(x)$ = the long wavelength wall radiation escaping from the absorber 10 but reflected back into it and which reaches $x$ without prior absorption.

Neglecting $K(x)$ due to the low thermal conductivity of the walls of the absorber 10 and, since it increases only linearly with absorber diameter, due also to the fact that the total cross-sectional area of the absorber wall and member 22 can be made insignificant compared to the cross-sectional area of the absorber cavity 12, the net wall radiation is:

$$f_n(x) = AT_0^4 \tau_b(x) + BT(x)^3 T'(x) \tag{2}$$

where, $$A \equiv \left(\frac{\pi D^2}{4}\right)\sigma \tag{3a}$$

$$B \equiv (4\pi\sigma D^3)(2-\epsilon)/3\epsilon \tag{3b}$$

$$T_0 \equiv T(0) \tag{3c}$$

and the $\sigma$ is the Stefan-Boltzman constant, $D$ is the absorber 10 diameter, $T(x)$ is the wall temperature, $\epsilon$ is the wall emissivity at long wavelengths and $\tau_b(x)$ is the transmission efficiency of the absorber 10 for long wavelength blackbody radiation. It is also convenient to describe the other radient fluxes in terms of transmission factors, $\tau_s(x)$ and $\tau_r(x)$.
Thus, $$F_s(x) = F_0 \tau_s(x) \tag{4}$$

$$f_r(x) = p f_n(0) \tau_r(x) \tag{5a}$$

$$= p \tau_r(x)[AT_0^4 + BT_0^3 T'(0)] \tag{5b}$$

where:

$$F_0 \equiv F_s(0) \tag{6a}$$

$$0 \leq p \leq 1 \tag{6b}$$

and, $$\tau_r(x) \approx \tau_b(x) \tag{7}$$

as the reflected radiation wavelenth distribution is almost identical with the wall radiation and the angular distribution is nearly blackbody if $p \to 1$. If $p \to 0$, then the accuracy of Eq. (7) is of little concern. Also we shall assume that the product of the flow rate of the fluid 42 and the fluid specific heat capacity, Cm, is constant as if the fluid 42 were an ideal gas. If we also neglect radial temperature gradients, i.e., assume thin walls, then $$C(x) = CmT(x) \tag{8a}$$

$$= F_0(T/T_0)S^{-1} \tag{8b}$$

where $S$ is the ratio of the primary radiation input power to thermal power input, $CmT_0$.

Now evaluating Eq. (1) at $x = 0$ we find, $$P_n - CmT_0 = F_0 - (1-p)T_0^3[AT_0 + BT'(0)] \tag{9a}$$

$$= E_a F_0 \tag{9b}$$

where $E_a F_0$ is the net radiant power captured by the absorber 10 and $E_a$ is absorber efficiency. Thus at $x = 0$.

$$BT_0^3 T'(0) = F_0(1-E_a)/(1-p) - AT_0^4 \tag{10a}$$

or in general, $$BT_0^3 T' = Cm(T-T_0) + F_0(\tau_s - E_a) + G\tau_b \tag{10b}$$

where $$G \equiv pF_0(1-E_a)/(1-p) - AT_0^4 \tag{10c}$$

Thus in dimentionless variables $$\frac{d(T/T_0)}{d(x/D)} = \frac{3\epsilon R^4}{16(2-\epsilon)}\left[\frac{(T/T_0)-1}{S} - E_a + \tau_b\left(\frac{p}{1-p} - \frac{1}{R^4} - \frac{pE_a}{1-p}\right) + \tau_s\right] \tag{11a}$$

where
$$F_0 = A(RT_0)^4 \tag{11b}$$

and $RT_0$ is the temperature that a black disk covering the entrance end 14 would attain in the cold radiation field of space. Now R, $\epsilon$, p and $T_0$ are independent parameters but $E_a$ is dependent on them and S, i.e., $E_a$, is a monotonically increasing function of Cm. Unfortunately $E_a(R,\epsilon,p,T_0,S)$ is not known apriori. When Cm is large (S small), the temperature achieved deep in the absorber 10, $T_L$, (L $\gg$ D) is low. Hence, even though $E_a$ is large when Cm is large, the overall efficiency $$E \leq E_a E_c \tag{12}$$

is low because the thermal-to-mechanical power conversion is limited by the Carnot efficiency
$$E_c = 1 - T_0/T_L \tag{13}$$

where we have assumed $T_0$ is also the Carnot exhaust temperature as if the fluid 42 were also circulated through the Carnot engine as the working fluid. Since in Eq. (10b), $\tau_s$, $\tau_b$ and T' all approach zero as $x \to \infty$, $$E_a = Cm (T_L - T_0) F_0^{-1} \quad (14a)$$

or in terms of S $$(T_L/T_0) = 1 + SE_a \quad (14b)$$

and consequently, $$E = Cm (T_L - T_0)^2 (T_L F_0)^{-1} \quad (15a)$$

or in terms of S $$E = SE_a^2 (T_0/T_L) \quad (15b)$$

however, $T_L$ and consequently $E$ are also unknown functions of $Cm$ (or $S$) assuming the parameters $R, \epsilon, p$ and $T_0$ are fixed.

In order to find the monotonic function, $E_a$ ($Cm$), and consequently $T_L(Cm)$ or $T_L(S)$ via Eqs. (14) and then $E(Cm)$ or $E(S)$ via Eqs. (15) we first characterize the system under study by a set of values for the parameters of Eq. (11), and also for both $p$, the wall reflectivity for the incident short wavelength flux, and $f(\theta)$, its angular distribution, so that $\tau_s(x)$ can be calculated. Then we select a particular $E_a$ of interest, calculate G and guess a test value of Cm wich we shall designate $C_\tau$. If $C_\tau > Cm$, then as Eq. (11) is solved for $T(x)$ at increasing $x$, using the initial conditions, the derivative $T'(x)$ will remain too large for $x \geq 0$ and in fact $T_L \to \infty$. Likewise, if $C_\tau < Cm$, then $T_L \to -\infty$ as $x \to \infty$. Consequently, for each physically realistic $E_a$ there is a unique value of $C_\tau$ for which $T_L$ remains finite as $x \to \infty$ and the relationship between $E_a$ and $Cm$ or $S$ is found from this condition.

But, for a simplified but practical example of this procedure, we assume $$\tau_s(x) = e^{-sx/D} \quad (16a)$$

rather than calculate $\tau_s(x)$ for some particular but equally arbitrarily chosen $f(\theta)$. Likewise for simplicity in the illustration of this method we take $$\tau_b(x) = e^{-bx/D} \quad (16b)$$

as a reasonable facsimile of a very complex function.

Then differentiating Eq. (10b), $$BT_0^3 T'' = CmT' - \left(\frac{s}{D}\right)F_0 \tau_s - \left(\frac{b}{D}\right)G\tau_b. \quad (17)$$

If $T''(0) \geq 0$, then Cm is too large as with uniform solar reflectivity, the rate of temperature increase must decrease with length.

Thus evaluating Eq. (17) at $x = 0$.

$$Cm \left[ \frac{F_0 (1 - E_a)/(1 - p) - AT_0^4}{BT_0^3} \right] \leq (sF_0 + bG)D^{-1} \quad (18a)$$

$$S \geq \left[ \frac{3\epsilon}{16(2 - \epsilon)} \right] \left[ \frac{R^4(1 - E_a)/(1 - p) - 1}{s + bp(1 - E_a)/(1 - p) - bR^{-4}} \right] \quad (18b)$$

Often the true value of Cm (or S) differs from the equality value given by Eqs. (18) by only a few percent. We will avoid numerical analysis here and continue by using the largest value of Cm permitted by Eqs. (18), i.e., the equality value. This approximation is conservative as the value of $T_L$ calculated from Eqs. (14) for fixed values of all the parameters on the right side of Eqs. (18), including $E_a$, is a few percent too low. Thus, the Carnot efficiency and consequently the overall efficiency. E calculated with Eqs. (15) is underestimated by a few percent if the Cm is taken at the largest value permitted by Eq. (18).

Figure 4:
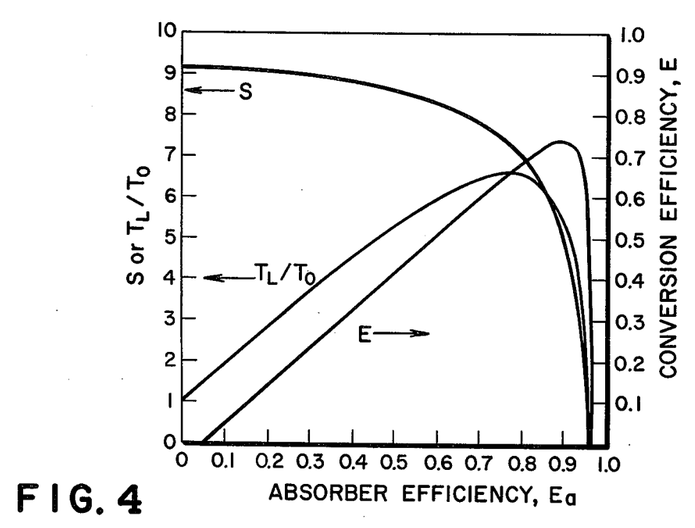
FIG. 4 is a graph illustrating the theoretical model for a straight cylindrical tubular absorber with external fluid flow and a vacuum interior, the overall efficiency being shown as a function of the absorber efficiency which is determined by the ratio of the solar input energy to the thermal input energy.
Figure 5:
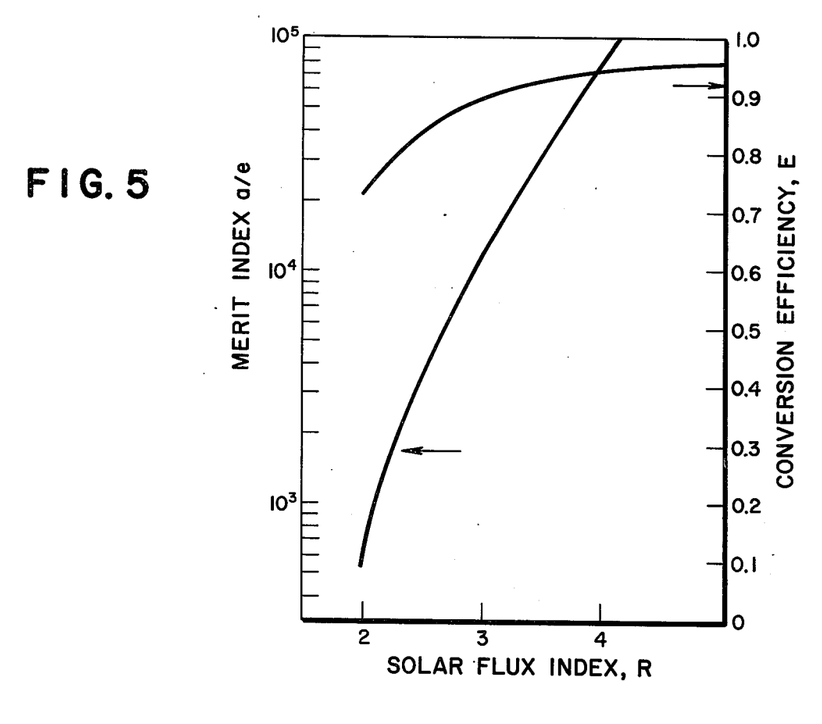
FIG. 5 is a graph illustrating the conversion efficiency and effective a/e ratio at optimum flow rates for varying solar fluxes; and, FIG. 6 is a schematic illustrating the conformation of a particularly efficient absorber entrance end.

It is possible to assume $$s = 0.05 \quad (19a)$$

and $$b = 0.5 \quad (19b)$$

as plausible values for attenuation coefficients of short and long wavelength radiations propagating in the absorber 10. It is also possible to take $$\epsilon = 0.9 \quad (19c)$$

and $$p = 0.5 \quad (19d)$$

as a conservative estimate of the fraction of wall radiation which can be reflected back into the absorber 10 with a good optical design, e.g., a phocon entrance such as will be described hereinafter or external mirrors. Next for a particular R, i.e. $R=2$, we assume various values for $E_a$ and with Eq. (18) calculate the corresponding value of S and then for this S and $E_a$ calculate E from Eq. (15b). The results of this $R=2$ case are shown in FIG. 4 and we see that a maximum overall efficiency of 73% results when $E_a = 90\%$. More rapid fluid flow produces higher absorber efficiency but lowers the exit temperature excessively. Likewise less rapid coolant flow can result in better Carnot efficiency, but reradiation losses reduce $R_a$ excessively. The efficiency at optimum coolant fluid flow rate for other values of R is shown in FIG. 5.

A conventional black absorber-radiator in the same solar flux would have much greater reradiation losses, lower $E_a$ and reach temperatures far less than $T_L$. For example, a conventional black absorber in an $R=2$ flux has a peak temperature even with no useful power output of only $2T_0$, thus it's Carnot efficiency would not exceed 50% even if the over all efficiency fell to zero. Thus, the present absorber 10 is three four times more efficient and functions well in poorly concentrated sunlight.

We can define an effective emissivity, $e$, for the surface of the entrance end 14 in terms of the exhaust temperature achieved and the reradiation losses, i.e.

$$F_0 (1 - E_a) = e A T_L^4 \quad (20)$$

and $a = 1$ as we have already noted
Thus $$a/e = (T_L/RT_0)^4 (1 - E_a)^{-1} \quad (21a)$$

or in terms of the dimentionless variables of our model, $$a/e = \left(\frac{1 + SE_a^4}{R}\right)\left(1 - E_a\right)^{-1} \quad (21b)$$

This effective $a/e$ at optimum coolant flow rate is also shown in FIG. 5. In general, this merit index shows that the present invention is much superior to the prior art.

This analysis has assume that the absorber 10 was deployed in the cold radiation field of space. Because of its high efficiency, relatively little waste heat must be rejected. Thus, in space, with a relatively small waste heat radiator located in the shadow of the concentrating mirror 40, $T_0 \ll 300°$ K would be possible. Then rather large values of $T_L/T_0$ could be tolerated without damage to a quartz absorber. In addition to higher predicted efficiency, for units producing several KW or more, this absorber and advanced turbine generators developed for sapce applications offer significantly lower cost and lift off weights compared to either solar cells or isotopic power supplies.

On earth $T_0 \geq 300°$ K and material problems limit the $T_L/T_0$ ratio to about 5. Thus for most of the day, even in northern lattitudes, the fluid flow rate would be automatically controlled to maintain the highers possible Carnot efficiency permitted by the construction materials and the absorber 10 would operate at greater than optimum efficiency. A linear slot absorber (not shown) over a parabolic mirror such as 40 is also attractive and may also be able to produce a materials-limited exhaust temperature.

In spite of the fact that $E_a$ is nearly unity, economic considerations would result in a significant part of the sunlight collected by the concentrating mirror 40 being poorly focused and wasted. However, unlike the uncollected waste heat that goes up the chimney of a conventional power plant and adds to the local environmental heat load, this concentrated sunlight can be reflected so as to escape from the earth at negligible incremental cost. Thus there need be no change in the local albedo. Since this simple, economic, absorber 10 is not dangerous, does not require intense sunlight, and need not have any net local ecological impact, it could be located in urban power demand areas to avoid transmission losses. It could also be used to make fuel by producing hot steam for known chemical cracking processes.

The fluid used to extract heat from the absorber 10 through the walls thereof may be in the gaseous or liquid state. A mixture of gases, such as air, is perfectly suitable as well as would a mixture of liquids, such as sodium and potassium. While a sodium-potassium mixture would be particularly suited to use for direct drive of a turbine or the like, any substance in a fluid state is useful in the practice of the invention since any fluid substance would have heat transfer capability.

As can be seen in FIG. 2, an absorber 100 has a longitudinal cross-section at its inner end, or cold end which is generated by revolution of a paraboloidal segment as will be described hereinafter. The absorber 100 further has a central cavity 102 defined by the walls thereof. A heat transfer fluid 104 is drawn through the central cavity 102 itself to absorb heat from the interior walls of the absorber 100. The heated fluid 104 is ducted through the absorber 100 from an inlet 106, substantially through the length of the central cavity 102, and through an outlet 108, the fluid 104 absorbing heat from the walls of the absorber 100 on movement therethrough. Thus, transfer of energy through the walls of the absorber 100 is avoided in this embodiment. The heated fluid 104 withdrawn from the outlet 108 may be used as desired, one potential manner of its use being described hereinafter. The flow of the fluid 104 through the absorber 100 acts to overcome heat loss by conduction within said absorber and also acts to extend the high temperature region further into the absorber, thereby improving the thermal efficiency thereof. If the fluid 104 be taken to be air having water vapor as a component part thereof, absorption of infrared radiation from the walls of the absorber by the water molecules in the air decreases the wall radiation escape probability and further improves thermal efficiency. Thus, any fluid 104 so used an be chosen for its infrared radiation absorptive ability as well as for its heat transfer capability. Alternately, desireable fluid 104 may be a mixture having one or more components with infrared absorption ability. The use of water vapor-laden air as the fluid 104 is simply an example of an inexpensive, non-polluting, non-toxic, readily available fluid having adequate heat transfer capability and infrared absorbing ability. While not shown in detail, a combination of fluid flow against the external walls of an absorber, such as the absorber 10 of FIG. 1, and through the central cavity of a absorber, such as the absorber 100, is useful, heat being thereby transferred from such an absorber both internally and externally thereof while infrared absorption by the interior fluid adds its benefit to the structure. The only significant requirement of the fluid 104 is that it be transparent to the desired electromagnetic wavelengths of sunlight.

Further referring to FIG. 2, a solar power plant is generally shown at 110 to utilize the energy obtained from the absorber 100 through thermal storage of said energy. Referring back to the absorber 100, it is seen that an optical focusing device, such as a lens 112, focuses solar energy through a transparent dome window 114 into the entrance end or mouth of the absorber 100. The lens 112 may be operated by suitable mechanical apparatus to image the sun into the entrance end of the absorber 100. The interior of the absorber 100 forms a part of a pressurized flow path for the fluid 104 through the plant 110, the walls of the absorber 100 extending to the dome window 114 at the entrance end thereof and being insulated by insulation 116 at and near the outlet end thereof.

A solar energy entering the absorber 100 reflects deeper thereinto, the temperature of the walls increases. The fluid 104 passing through the central cavity 102 extracts heat from the walls and emerges as a relatively hot fluid at the outlet 108. The hot fluid then enters a subterranean thermal energy storage tank 118 which is suitably insulated. The storage tank 118 can be made of iron and filled with a brick lattice work which permits the fluid 104 to circulate through it with efficient energy transfer between the fluid and the contents of the tank. The insulation for the tank 118 might simply be dry and 10 to 20 feet thick surrounding the iron tank on all sides, the dry sand being contained in a vented masonry chamber (not shown) to prevent excessive intrusion of ground water. The heat and the vent assure that the sand remains dry. The inner most layers of and adjacent to the tank can provide additional energy storage. Radial fins can be attached to the iron tank, to facilitate radial heat flow. Longitudinal fins should not be used as axial heat coduction through the tank 118 is undesirable as will be explained hereinafter.

Some or all of the hot fluid 104 passes through a tank bypass tube 120 and a tank bypass alve 122 to enter a motor (expansion) unit 124 and produce useful work. The fluid 104 is still warm when it enters a counterflow heat exchanger 126 which extracts heat from the fluid so that a relatively cold, low pressure flow of fluid enters a compressor 128 located in the system. The output flow from the compressor 128 is a cool high pressure fluid which is directed through a day valve 130 back into the tubular absorber 100 if sunshine is available or through a night valve 132 if inadequate sunshine is available.

At night time or during periods of low light levels, when the night valve 132 is open, the relatively cool high pressure fluid from the compressor 128 passes through a night line 134, into the left end of the thermal energy storage tank 118 remote from the absorber 100 and a "store energy" valve 136 is closed. Thus, the night time flow of fluid 104 through the storage tank 118 cools an increasing volume of the left end of the storage tank but is heated to almost the temperature of the right end in a relatively short section of the storage tank and does not appreciably reduce the temperature of the right end. Thus, the storage tank 118 has a cool left region, a relatively short temperature transition zone, and a high temperature right region. During the night or other times when energy is extracted from the storage tank, the transition zone moves into the high temperature region which decreases in volume, and the cool, left region grows in volume. Axial conduction in the brick lattice work is undesirable as it tends to make the temperature of the storage tank more uniform and thus lower the temperature of the gasses entering the expansion motor unit 124.

During those daylight hours when more energy is available than required, the store energy valve 136 is partially open and tank bypass valve 122 is partially closed. Then part of the hot flow of fluid 104 from the tubular absorber 100 is drawn through the energy storage tank 118 and the temperature transition zone is moved into the cool left region which decreases in volume as energy is added to the energy storage tank, This part of the flow passing through the store energy valve 136 is cool and mixes with the hot flow from the tank bypass valve 122 as shown. Under certain circumstances, it is desirable to avoid excessive reduction in the inlet temperature of the expansion motor unit 124 and yet also desirable to make the flow through the energy storage tank 118 relatively large. This is possible if part or all of the flow through the energy storage tank 118 is forced by a pump (not shown in FIG. 2) backwards through the night line 134 and the night valve 132. If no output power from the motor unit 124 is desired, then all of the flow through the absorber 100 can be pumped backwards through the night line 134 and night valve 132 to achieve maximum storage of energy.

During hours of intense sunlight, the flow through the absorber 100 is relatively large and maintained to avoid damage to the absorber. At night and at other times when the flow downward through the absorber 100 is inadequate to prevent natural convective heat transfer upwards through the absorber, it is closed off by an internal insulating plug (not shown in FIG. 2). The thermodynamic cycle for the plant 110 is closed and the working gas of the expansion motor unit 124 is the same as employed in the absorber 100 in the system shown in FIG. 2. Carbon dioxide and/or steam are attractive for use as the fluid 104 as they are chemically stable at high temperatures, have strong infrared absorption bands, are relatively noncorrosive and have adequate molecular weight to permit economical turbo-compressor designs. Further, the energy storage tank 118 is far below ground level; thus, even a rapid pressure failure in the high temperature storage tank 118 is unlikely to cause damage at ground level. Since most of energy in the system is stored in the thermal storage mass within the tank 118, there is less danger than in a conventional steam boiler.

Enclosure of the absorber 100 as shown in FIG. 2 to protect the device from the elements is desirable. The concentrating optics may also be economically and advantageously enclosed for protection. Use of a fluid 104 having strong absorption capability in the infrared prevents escape of wall radiation as described previously by internally reabsorbing the energy. This absorption effectively prevents wall radiation from escaping and at high temperatures significantly aids in the radial transport of energy in the cooling fluid 104 and reduces radial temperature radients. Unfortunately, the radiation from the hot fluid 104 partially replaces the wall radiation it prevents. However, at no wavelength can this hot fluid radiation exceed the essentially blackbody radiation it replaces. Thus, the net effect is beneficial.

With uniform solar reflectivity the thermal flux on the walls of the absorber decreases with distance from the entrance end. Because of this fact and the fact that the fluid temperature is steadily increasing, the heat flux into the fluid decreases with distance more rapidly than the thermal flux on the walls. Economic considerations related to the insulation cost can make an intentional reduction in the solar reflectivity with distance from the entrance end desirable even though the reradiation losses would increase. Thus, shorter absorber tube lengths with the same net solar absorption are possible.

Figure 6:
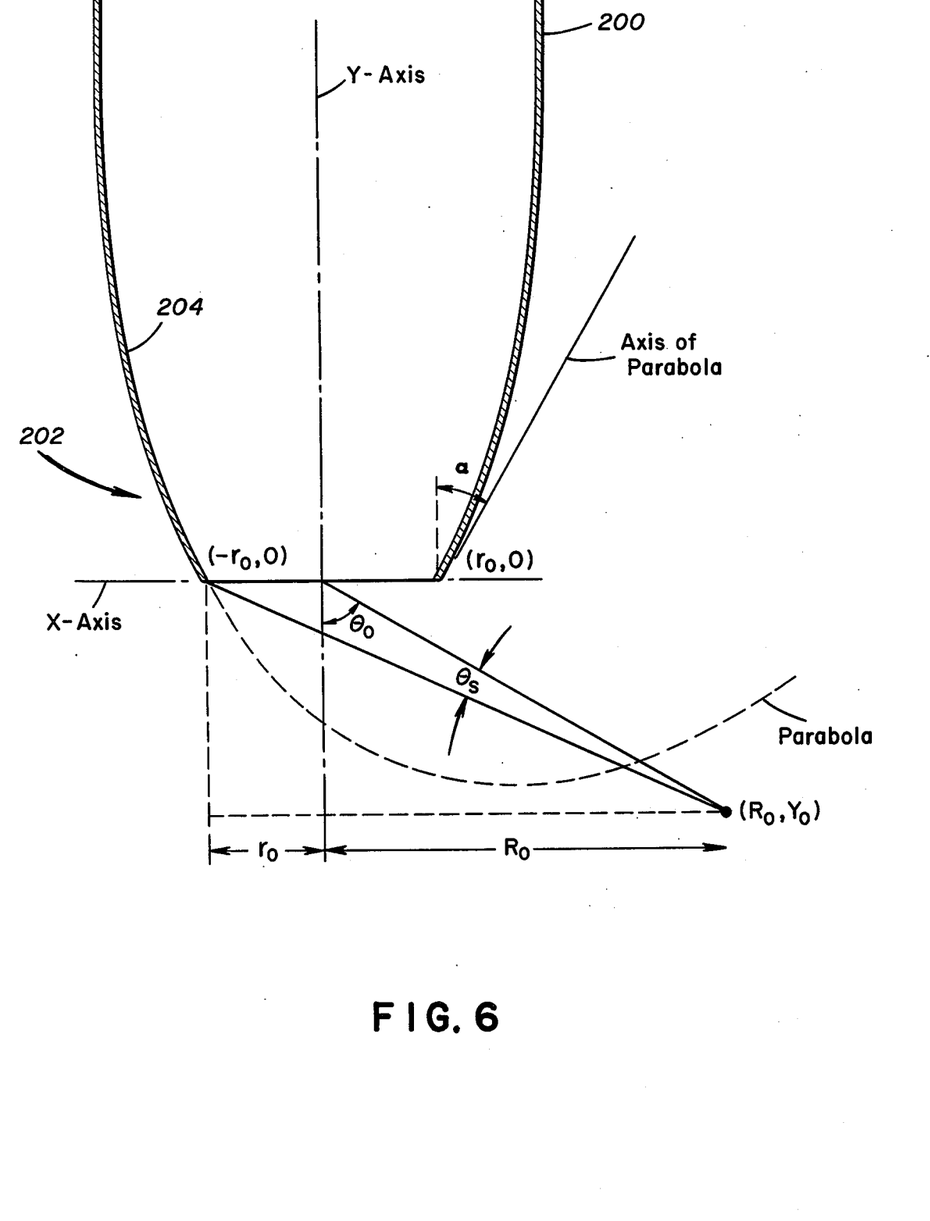

The conformation shown in FIG. 2 for the absorber 100 at its entrance end, or cold end, should now be described in greater detail due to the great increase in absorber efficiency which can be attained with the use thereof. This particular conformation can be employed to advantage with any of the embodiments described herein, even though paraboloidal sections or any virtually any shape having a longitudinal cross-section whereby the absorber increases in section with distance from the inner (or entrance) end thereof. As seen in FIG. 6, an absorber tube 200, is shown to be formed as a right circular cylinder except at its entrance end 202, the entrance end 202 having a cross-section which increases with distance from the entrance end 202 toward the cylindrical body of the absorber tube 200 so that solar radiation collected by the surface of the concentrating optics of radius $R_o$ associated therewith near the rim of said optics is converted into more nearly paraxial rays after the first reflection inside the absorber and thus travels much further thereinto before being absorbed. The entrance end 202 is formed of a paraboloidal segment 204 of rotation, the segment 204 having one end fixed at the point $(-r_o, o)$ on the Cartesian axis, the parabola of which the segment 204 is taken having its focus at the point $(r_o, o)$ and having its axis inclined to the y-axis by the angle $\alpha$. Thus, the equation for the segment 204 is given by:

$$[(x-r_o)\cos\alpha - y\sin\alpha]^2 = 4r_o(1+\sin\alpha)(x\sin\alpha + y\cos\alpha + r_o)$$

Rotation of this curved segment 204 about the y-axis generates the "paraboloidotoridal phocon" which is the shape taken by the entrance end 202. In the preferred embodiment, the choice of the angle $\alpha$ is usually related to the rim angle of the concentrator optics $\theta_o$ by $$\alpha = \pi/2 - \theta_o$$

but other relationships between $\theta_o$ and $\alpha$ are practical. The length of this entrance end 202 is arbitrary but may be usefully limited by its intersection with the line given by:

$$y \tan \alpha = -x.$$

This shape acts to decrease the angle by which rays are inclined to the axis of the tube 200. It is to be pointed out that $r_o$ is taken to be the radius of a circle containing all rays in the focal plane of the concentrating optics and subtends a half angle $\theta_s$ equal to the source. The relationships described can be used to generate entrance end conformations suitable to varying uses depending on the maximum angle of inclination of those rays which are desired to be focused into the absorber tube 200. As an example, if the rim angle of a concentrating mirror is 60° the length of this initial phocon entrance end 202 required to convert all rays to 30° or less inclination to the absorber axis is only 1.15 maintube (tube 200) diameters. The entrance area for this example would be only 28% of the absorber cross section and consequently much of the shortest wavelength wall radiation or hot gas radiation not blocked by the selective mirror action of the walls would fail to escape from this convergent phocon exit. Both the increased distance between reflections for the solar radiation propagating into the absorber tube 200 and the relatively larger main tube diameter also act to make the thermal wall flux load very much smaller than the entrance flux. It is to be understood that any increasing cross-sectional portion at the entrance end of an absorber improves performance. The cross-sectional shape may be conical or otherwise than is shown particularly in FIGS. 2 or 6.

Figure 3:
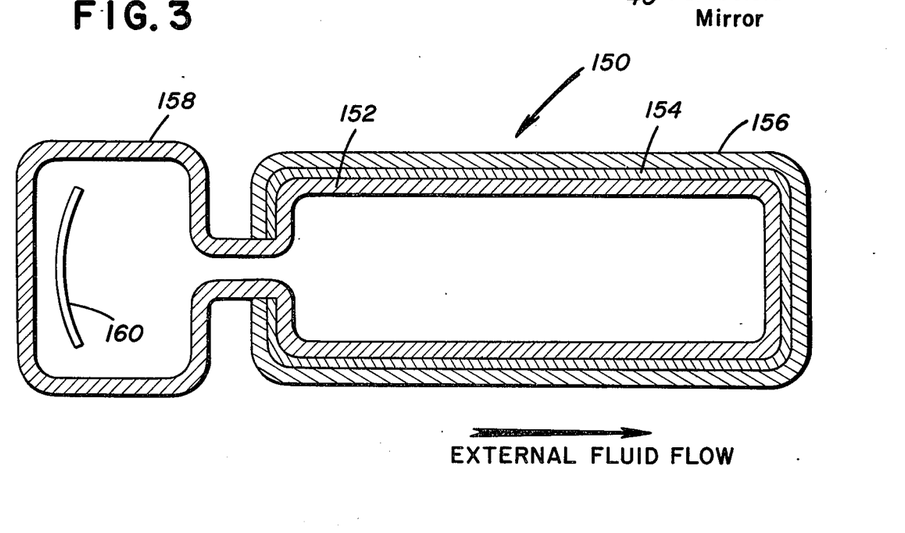
FIG. 3 is an elevational view in section of an embodiment of the invention illustrating a sealed cavity.

Referring to FIG. 3, a sealed absorber 150 is shown to comprise an absorber body 152 silvered for reflective purposes by a silver layer 154 and insulated by an insulative layer 156. The body 152 has an integral window portion 158 which encloses an optical focusing mirror 160. In this embodiment of the invention, the interior of the cavity defined by the body 152 is sealed from ambient and has an internal atmosphere of a desired nature, such as gases which are capable of undergoing a chemical change on heating thereof by the absorbed solar energy. The flow of fluid for cooling the absorber 150 (not shown) could also be external of the absorber body 152 in this embodiment. The window portion 158 may be a focusing optical element itself or may be a bundle of optical fibers for concentrating energy into the entrance end of the body 152 by internal reflection.

Energy developed in the present absorber structures may also be stored chemically such as heating water (or other suitable fluid) either internally or externally (or both) of the absorber structure to produce steam at a desired temperature, such as 1300° to 1400° K, and then directing the heated steam against a substance or mixture of substances to cause a reaction which effectively stores energy. As an example, an alkali oxide may be decomposed in this fashion. On cooling of the steam (to 600° to 700° K) some of the steam could be used to react with the alkali metal previously produced to produce hydrogen, this substance essentially storing the energy developed in the absorber for later use, such as by burning. The chemistry of such an operation is similar to that described in U.S. Pat. No. 3,490,871.

As is obvious, many techniques may be employed to utilize the energy-laden fluid as it exists either one of the absorbers 10 or 100. While one example has been given, it should be recognized that chemical, electrical, and other mechanical apparatus may be so employed. For example, the hot fluid absorber according to the invention could be used for smelting a metal ore by direct contact with the hot fluid. Further, the fluid in an absorber according to the invention can be chosen so as to be capable of maintaining a net electric charge, the absorber being arranged as a thermoelectric generator to produce a useful effect either inside or outside (or both) of the absorber. The invention, as described hereinabove and defined by the following claims, is therefore seen to be useful in a variety of applications where radiant energy is to be collected and utilized.

I claim:

1. Apparatus for facilitating energy flow, comprising:
    body means having walls which define a cavity and an entrance opening to the cavity;
    a flowable mass of material; at least a portion of which material is disposed within the cavity and comprises a fluid composition capable of undergoing a chemical change on exposure to energy;
    means for directing energy into the entrance opening of the body means;
    means surmounting the entrance opening of the body means and sealing said cavity from ambient, said means being transparent to the energy being directed into said entrance opening; and,
    means for directing a flow of said mass along the walls of the body means away from the entrance opening thereof to cool certain portions of said body means which are near the entrance opening relative to other portions of said body means relatively further away from said entrance opening.

2. The apparatus of claim 1 wherein the energy directed into the entrance opening of the body means is non-thermal energy.

3. The apparatus of claim 1 wherein the walls of the body means are at least partially transparent and absorbent to the energy directed into the entrance opening of the body means, the walls being covered over at least a portion of their surfaces opposite those surfaces defining the cavity with a reflective layer, the energy entering the cavity of the body means through the entrance opening being reflected by said layer into the cavity in a direction away from the entrance opening for absorption of said energy by said walls, the flow of mass along the walls cooling those portions of the body means nearest the entrance opening relative to those portions of the body means located relatively more distant from the entrance opening, thereby to prevent thermal reradiation from the cavity through the entrance opening.

4. The apparatus of claim 1 and further comprising insulation disposed about the body means, the insulation comprising alternate layers of thin metal and dust-like particles separating the layers of thin metal.

5. The apparatus of claim 1 wherein the walls are formed of a material more transparent to the energy entering the cavity than to the radiation from the walls resulting from energy absorbed by said walls.

6. The apparatus of claim 1 wherein the walls are formed of material relatively near the entrance opening which is a good absorber of infrared radiation relative to the material of which the walls are formed at portions of the body means relatively further away from the entrance opening.

7. The apparatus of claim 1 wherein that portion of the walls of the body means relatively near to and defining the entrance opening is formed cross-sectionally as a paraboloidal segment, the segment being mirror imaged across the longitudinal axis of the body means.

8. The apparatus of claim 7 wherein the paraboloidal segment is defined by the relation:

$$[(x-r_o)\cos\alpha - y\sin\alpha]^2 = 4r_o(1+\sin\alpha)(x\sin\alpha + y\cos\alpha + r_o)$$

wherein:

$r_o$ = the distance of a point on the entrance opening from the longitudinal axis of the body means; and, $\alpha$ = inclination of the axis of the paraboloidal segment from the longitudinal axis of the body means.

9. The apparatus of claim 1 wherein the entrance end is formed into a slot, the slot being aligned with a line focus energy directing means.

10. The apparatus of claim 1 and further comprising:
thermal storage means for receiving the mass of material after contact of said mass with the walls of the body means;
means receiving said mass from said thermal storage means for producing work; and,
means for returning said mass to the body means after work has been produced in the work producing means.

11. The apparatus of claim 10 and further comprising means for selectively returning said mass either to the body means or to the thermal storage means after work has been produced in the work producing means.

12. The apparatus of claim 1 wherein the mass of material is comprised of a substance absorptive of infrared radiation.

13. Apparatus for facilitating energy flow, comprising:
body means having walls which define a cavity and an entrance opening to the cavity, the walls being formed of material relatively near the entrance opening which is a good absorber of infrared radiation relative to the material of which the walls are formed at portions of the body means relatively further away from the entrance opening;
a flowable mass of material; and,
means for directing a flow of said mass along the walls of the body means to cool certan portions of said body means relative to other portions thereof.

14. The apparatus of claim 13 wherein the mass of material is comprised of a substance absorptive of infrared radiation.

15. The apparatus of claim 13 and further comprising means for directing energy into the entrance opening of the body means, the flow of mass being directed by said mass flow directing means away from the entrance opening of said body means.

16. The apparatus of claim 13 and further comprising window means surmounting the entrance opening of the body means and sealing said cavity from ambient.

17. The apparatus of claim 16 wherein the energy directing means are disposed within the sealed confines of the window means.

18. The apparatus of claim 13 and further comprising window means surmounting the entrance opening of the body means and sealing said cavity from ambient, the means for directing a flow of said mass being disposed within the sealed confines of the window means.

* * * * *